US006490578B1

(12) United States Patent
Burkhard

(10) Patent No.: US 6,490,578 B1
(45) Date of Patent: Dec. 3, 2002

(54) DATABASE SYSTEM WITH METHODOLOGY FOR HIGH-PERFORMANCE DATE

(75) Inventor: Neil A. Burkhard, Westford, MA (US)

(73) Assignee: Sybase, Inc., Dublin, CA (US)

( * ) Notice: Subject to any disclaimer, the term of this patent is extended or adjusted under 35 U.S.C. 154(b) by 272 days.

(21) Appl. No.: 09/675,247

(22) Filed: Sep. 28, 2000

Related U.S. Application Data

(60) Provisional application No. 60/194,853, filed on Apr. 5, 2000.

(51) Int. Cl.[7] .............................................. G06F 17/30
(52) U.S. Cl. ........................................................ 707/3
(58) Field of Search ......................................... 707/2–3

(56) References Cited

U.S. PATENT DOCUMENTS

| | | | |
|---|---|---|---|
| 4,606,002 A | | 8/1986 | Waisman et al. |
| 4,677,550 A | | 6/1987 | Ferguson |
| 4,791,561 A | | 12/1988 | Huber |
| 4,805,099 A | | 2/1989 | Huber |
| 4,947,320 A | | 8/1990 | Crus et al. |
| 5,089,952 A | | 2/1992 | Bozman |
| 5,115,392 A | | 5/1992 | Takamoto et al. |
| 5,123,104 A | | 6/1992 | Levine et al. |
| 5,163,148 A | | 11/1992 | Walls |
| 5,204,958 A | | 4/1993 | Cheng et al. |
| 5,265,244 A | | 11/1993 | Ghosh et al. |
| 5,430,869 A | | 7/1995 | Ishak et al. |
| 5,493,728 A | | 2/1996 | Solton et al. |
| 5,504,888 A | | 4/1996 | Iwamoto et al. |
| 5,555,389 A | | 9/1996 | Satoh et al. |
| 5,765,146 A | * | 6/1998 | Wolf et al. .................... 707/2 |
| 5,842,196 A | | 11/1998 | Agarwal et al. |
| 6,208,993 B1 | * | 3/2001 | Shadmon .................... 707/102 |
| 6,324,535 B1 | * | 11/2001 | Bair et al. .................... 345/419 |
| 6,353,821 B1 | * | 3/2002 | Gray ............................. 707/2 |

* cited by examiner

Primary Examiner—Safet Metjahic
Assistant Examiner—Haythim J. Alaubaidi
(74) Attorney, Agent, or Firm—John A. Smart

(57) ABSTRACT

System and methods are described for improved indexing and processing (e.g., query processing) of date-based information. A date value may be viewed as comprising year (y), month (m), and day (d) components. A DateIndex index data structure is defined to comprise three distinct groups of bitmaps: one for years, another for months, and another for days, respectively. This index can be created on a column having a datatype of "date" (e.g., standard SQL datatype which stores date literals). A month group is defined to contain exactly 12 bitmaps (call them M[1], M[2], . . . , M[12]) to track rows meeting at a specified month range for a particular column. Each successive bitmap within the group stores a successively smaller subrange of possible month values (e.g., month 1–12, month 2–12, month 3–12, and so forth and so on). In a similar manner, bitmaps may be created for tracking day and year ranges. Additionally, an "existence bitmap" (EBM) is used to track whether particular rows exist in a given column being indexed. Armed with this information, the system can now resolve a desired query operation using set algebra. Depending on the particular date value(s) under consideration, use of set algebra may often be optimized, thereby reducing the number of bitmap operations required. By providing a new index structure specifically designed for date columns, the approach significantly reduces the number of bitmap operations required to do each of these operations and also significantly reduces the amount of I/O required to do each operation.

51 Claims, 3 Drawing Sheets

DATABASE SYSTEM WITH METHODOLOGY FOR HIGH-PERFORMANCE DATE

RELATED APPLICATIONS

The present application is related to, and claims the benefit of, priority from commonly-owned U.S. provisional application Ser. No. 60/194,853, filed Apr. 5, 2000, entitled DATABASE SYSTEM WITH METHODOLOGY FOR HIGH-PERFORMANCE DATE INDEX, the disclosure of which (including any attachments and appendices thereof) is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data processing environments and, more particularly, to system and methods for improved indexing and processing of date information present in data records in those environments.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

One purpose of a database system is to answer decision support queries and support transactions. A query may be defined as a logical expression over the data and the data relationships set forth in the database, and results in identification of a subset of the database. For example, a typical query might be a request, in SQL syntax, for data values corresponding to all customers having account balances above required limits. During query processing, a database system typically utilizes one or more indexes to answer queries. Indexes are organized structures associated with the data to speed up access to particular data values (i.e., answer values). Indexes are usually stored in the database and are accessible to a database administrator as well as end users. The basic operation of database systems, including the syntax of SQL (Structured Query Language), is well documented in the technical, trade, and patent literature; see, e.g., Date, C., *An Introduction to Database Systems*, Volume I and II, Addison Wesley, 1990; the disclosure of which is hereby incorporated by reference.

"Data warehouse" systems represent a type of database system optimized for supporting management decision making by tracking and processing large amounts of aggregate database information—that is, the data warehouse. Data warehouses contain a wide variety of data that present a coherent picture of business conditions at a single point in time. Development of a data warehouse includes development of systems to extract data from operating systems plus installation of a warehouse database system that provides managers flexible access to the data. A well known example of a data warehouse system is Sybase® Adaptive Server® IQ (ASIQ), available from Sybase, Inc. of Emeryville, Calif.

The desire to support fast, ad hoc query processing in large data warehouse applications has led to the development of novel indexing schemes. Within ASIQ, for instance, there are several special-purpose indexing structures, including FastProjection (FP), LowFast (LF), HighNonGroup (HNG), LowDisk (LD), and HighGroup (HG). Each will be briefly described in turn.

FastProjection methodology entails vertical partitioning of the data into a single column stored as an array of data, where each cell in the array is as wide as the data column and the number of cells in the array matches the number of rows in the table. This index is used to provide fast access to the original data value given a row number. In LowFast methodology, an index is employed which comprises a B-Tree together with a set of bitmaps. The B-Tree has one node for each unique value in the column and each node has a bitmap associated with it. The associated bitmap has the nth bit on if the nth row of the table contains the value in the B-Tree. This index is used to provide fast access to a set of row numbers given a value among a small set of distinct values (under 1000). Without further optimization or compression, the technique requires a fair amount of disk space to do this.

In HighNonGroup methodology, an index which comprises a set of bitmaps is employed. The number of bitmaps in the set (i.e., 8×width-in-bytes) depends on the maximum width of the data in the column. The value for each row in the table is broken into its component bits. The nth bitmap has the mth bit on if the nth bit of the value (taken left to right) at the mth row of the table is on. This index is used to provide fast access to a set of row numbers given a range of values among a large set of distinct values (over 1000), when query grouping operations are not needed. It uses a moderately small amount of disk space to do this.

In the LowDisk methodology, an index which comprises a B-Tree and an HNG index is employed. The B-Tree has one node for each unique value in the column and each node has a small unique integer assigned to it. The small unique integer assigned to the value for each row in the table is broken into its component bits. The nth bitmap has the mth bit on if the nth bit of the small unique integer (taken left to right) assigned to the value at the mth row of the table is on. This index is used to provide moderately fast access to a set of row numbers given a value among a small set of distinct values (e.g., under 1000). It uses a very small amount of disk space to do this but is typically not as fast as the LowFast index.

With HighGroup methodology, an index is employed comprising a B-Tree, an HNG index, and a variation on the FP index. The B-Tree has one node for each unique value in the column and each node has a location in the modified FP index. The embedded HNG index is a normal HNG index and is used to satisfy wide range queries and aggregation functions (i.e., SUM). The B-Tree and modified FP are used to provide fast access to a set of row numbers given a value among a large set of distinct values (over 1000). They are also used to provide efficient handling of grouping queries. The technique uses a relatively large amount of disk space to do this.

For further description of the above-mentioned indexing methodologies, as well as a description of the ASIQ system and architecture, see, e.g., U.S. Pat. Nos. 5,649,181, 5,852,821, 5,794,229, 5,794,228, and 5,924,091, the disclosures of which are hereby incorporated by reference.

During database system operation, query processing depends on the ability to have an index perform comparison operations (e.g., <, <=, =, !=, >, and >=operations) and range operations (e.g., A<=x<B). The cost of performing any one of these operations directly affects how well suited the index is for resolving a given query. Often, data warehouses track historical (i.e., date-based) information, such as sales information gathered over a period of time. Expectedly, date processing within queries tends to be quite common in the typical data warehouse. Representative examples include the following, shown as sample SQL "select" queries.

select . . . from table where 1_shipdate>='1993-07-01' and 1_shipdate<'1993-10'01 select . . . from table where o_orderdate<'1993-03-10'

These examples may serve to illustrate some of the indexing operations performed on date columns. Choosing an appropriate index for the date column will directly affect how quickly the query can be resolved. For a low number of date values (i.e., low cardinality data), one would typically select an HNG index type. These indexes are good for a wide range of queries, including aggregations, since query results can be obtained by reducing a given query into a sequence of logical AND, OR, and XOR operations performed on these bit vectors or bitmaps.

In gauging query processing efficiency, a good measure of the performance of any given operation (e.g., comparison operation) can be thought of as the number of bitmap-logical operations the system has to perform: the fewer bitmap operations required, the better the system's performance. Ignoring for a moment the I/O (Input/Output) costs, one can measure the cost of performing the comparison (<, <=, =, !=, >, >=) and range operations for an HNG index on a date column by calculating the number of bitmap operations required to resolve the query. With ASIQ, a date is a 32-bit quantity (e.g., 32-bit integer). Hence, for this sample datatype, a range query requires at the most 64 bitmap operations, and a comparison operation (i.e., <, <=, =, !=, >, or >=) requires at the most 32 bitmap operations. Of course given a large data warehouse containing millions of records, the cumulative effect of these bitmap operations for a given date query may consume substantial system resources and time.

As there is much interest in improving the performance of data warehouse systems, there is a need for a new index structure specifically designed for date columns that will significantly reduce the number of bitmap operations required to do each of these operations and also significantly reduce the amount of I/O required to do each operation. The advantage of such a solution becomes even more pronounced as the number of rows in a given index space grows—a situation commonly encountered with data warehouses. The present invention fulfills this and other needs.

SUMMARY OF THE INVENTION

System and methods are described for improved indexing and processing (e.g., query processing) of date-based information. The system provides a specialized date index, the DateIndex, for indexing date-based information through use of bitmap groups or sets. In particular, individual groups are provided for year, month, and day components, respectively.

Each bitmap within a given group may be defined to be an infinite array (bit[ ]) of bits, with any given bit "i" having a value of 0 or 1, only. A bitmap may be used to identify which rows in a database table have a particular value X. For example, to track rows that have a value 5, as one inserts values into a given database table for each row "i" that has value 5, one may set bit[i]=1.

A date value may be decomposed into individual year (y), month (m), and day (d) components. Within a database system, dates have the following characteristics.

Range of 12 months maximum

Range of 31 days maximum

Range of N years (N not necessarily known a priori)

A DateIndex index data structure of the present invention is defined to comprise three distinct groups of bitmaps: one for years, another for months, and another for days, respectively. This index can be created on a column having a datatype of "date" (e.g., standard SQL datatype which stores date literals).

Consider, for instance, a database table with a single column C with an accompanying DateIndex index on that column. The month group contains exactly 12 bitmaps (call them M[1], M[2], . . . , M[12]) to track rows in column C containing month ranges for that column. The month group tracks rows as follows.

M[1] tracks rows in table that have dates containing months 1 through 12, inclusive M[2] tracks rows in table that have dates containing months 2 through 12, inclusive M[3] tracks rows in table that have dates containing months 3 through 12, inclusive . . .

M[12] tracks rows in table that have dates containing months 12 through 12, inclusive As shown, each successive bitmap stores a successively smaller subrange of possible month values (e.g., 1–12, 2–12, 3–12, and so forth and so on). M[1] contains a 0 for row 'i' when the value of row 'i' is NULL.

The day group contains exactly 31 bitmaps (call them D[1], D[2], . . . , D[31]) to track rows in column C containing ranges of days for that column. In a manner similar to that described above for the month group, the day group is employed as follows.

D[1] tracks rows in table that have dates containing days 1 through 31, inclusive D[2] tracks rows in table that have dates containing days 2 through 31, inclusive D[3] tracks rows in table that have dates containing days 3 through 31, inclusive D[31] tracks rows in table that have dates containing days 31 through 31, inclusive Again, each successive bitmap stores a successively smaller subrange of possible values. D[1] contains a 0 for row 'i' when the value of row 'i' is NULL.

Continuing in this manner, the year group contains N bitmaps (call them Y[1], Y[2], . . . , Y[N]) to track rows in column C containing ranges of years. N is the number of distinct years. Suppose a given database table contains dates with years 1997, 1999, and 2000. In such a case, N=3 and one has the following.

Y[1] tracks rows in table that have dates containing years 1997, 1999, and 2000, inclusive Y[2] tracks rows in table that have dates containing years 1999, and 2000, inclusive Y[3] tracks rows in table that have dates containing years 2000, inclusive As before, each successive bitmap stores a successively smaller subrange of possible values, in this case, year date values. Y[1] contains a 0 for row 'i' when the value of row 'i' is NULL. Note for the example dates above (i.e., 1997, 1999, and 2000), there is no bitmap containing the year range starting with 1998 since there are no rows in column C containing date values consisting of that year. In other words, no bitmap is employed to represent the subrange of 1998–2000, as there are no 1998 year date values.

The above description highlights the current embodiment whereby a bitmap is used for every month subrange (1–12) and every day subrange (1–31) regardless of whether the data set has any date values with months (or days) in the range. For example, if the data set only contains data values with months January, February, and April, then the month subrange bitmaps M[5] through M[12], inclusive, are empty.

Alternatively, one could organize the month group and day group like the year group. For example, instead of having 12-month subrange bitmaps, one employs only N where N is the actual number of distinct months in the data set (i.e., January, February, and April in the preceding example). In other words, there is no bitmap containing the subrange March–December as there are no March date values. In this manner, a similar approach may be adopted for the day group. Nevertheless, it is not believed that organizing the month and day groups like this yields any appreciable gains because of the extra processing to access the appropriate date or month group and the fact that, with the currently-preferred embodiment, empty bitmaps occupy minimal space within the database system.

Finally, in accordance with the present invention, an "existence bitmap" (EBM) is used to track whether particular rows exist (with regards to a particular record identifier (RecordID)) in the column C. Here, EBM[i]=1 means row with RecordID 'i' exists; 0, of course, means the row with RecordID 'i' does not exist.

Armed with this information, the system can now resolve a desired query operation using set algebra. For a query predicate involving an "equal to" operation (EQ), for instance, the "equal to" operation may be reduced to the following.

$$EQ=(Y[y]-Y[y+1]) \cap (M[m]-M[m+1]) \cap (D[d]-D[d+1])$$

(where $\cap$ indicates set intersection—logical "and" operation)
A "not equal to" operation (NE) may be reduced to the following.

$$NE=EBM-EQ$$

A "greater than" operation (GT) may be reduced to the following.

$$GT=Y[y+1] \cup ((Y[y]-Y[y+1]) \cap M[m+1]) \cup ((Y[y]-Y[y+1]) \cap (M[m]-M[m+1]) \cap D[d+1])$$

(where $\cup$ indicates set union—logical "or" operation)
A "greater than or equal to" operation (GE) may be reduced to the following.

$$GE=Y[y+1] \cup ((Y[y]-Y[y+1]) \cap M[m+1]) \cup ((Y[y]-Y[y+1]) \cap (M[m]-M[m+1]) \cap D[d])$$

This can be simplified to the following using set algebra distributive laws.

$$GE=Y[y+1] \cup ((Y[y]-Y[y+1]) \cap (M[m+1] \cup ((M[m]-M[m+1]) \cap D[d])))$$

The "less than" (LT) operation is defined in terms of the preceding ones, as follows.

$$LT=EBM-GE$$

The "less than or equal to" (IE) operation is defined in terms of the preceding ones.

$$LE=EBM-GT$$

Range operations, such as Date1>X and Date2<Y, are simply a combination of the preceding operations as indicated below.

Date1>=X and Date2<=Y: GE$\cap$LE

Date1>=X and Date2<Y: GE$\cap$LT

Date1>X and Date2<Y: GT$\cap$LT

Date1>X and Date2<Y: GT$\cap$LE

By providing a new index structure specifically designed for date columns, the present invention significantly reduces the number of bitmap operations required to do each of these operations and also significantly reduces the amount of I/O required to do each operation.

DETAILED DESCRIPTION OF A PREFERRED EMBODIMENT

The following description will focus on the presently-preferred embodiment of the present invention, which operates in a network environment executing client/server database applications. The present invention, however, is not limited to any particular application or environment. Instead, those skilled in the art will find that the present invention may be advantageously applied to any application or environment requiring indexing or processing of date-based data. The description of the exemplary embodiments which follows is, therefore, for the purpose of illustration and not limitation.

System Hardware

Figure 1A:
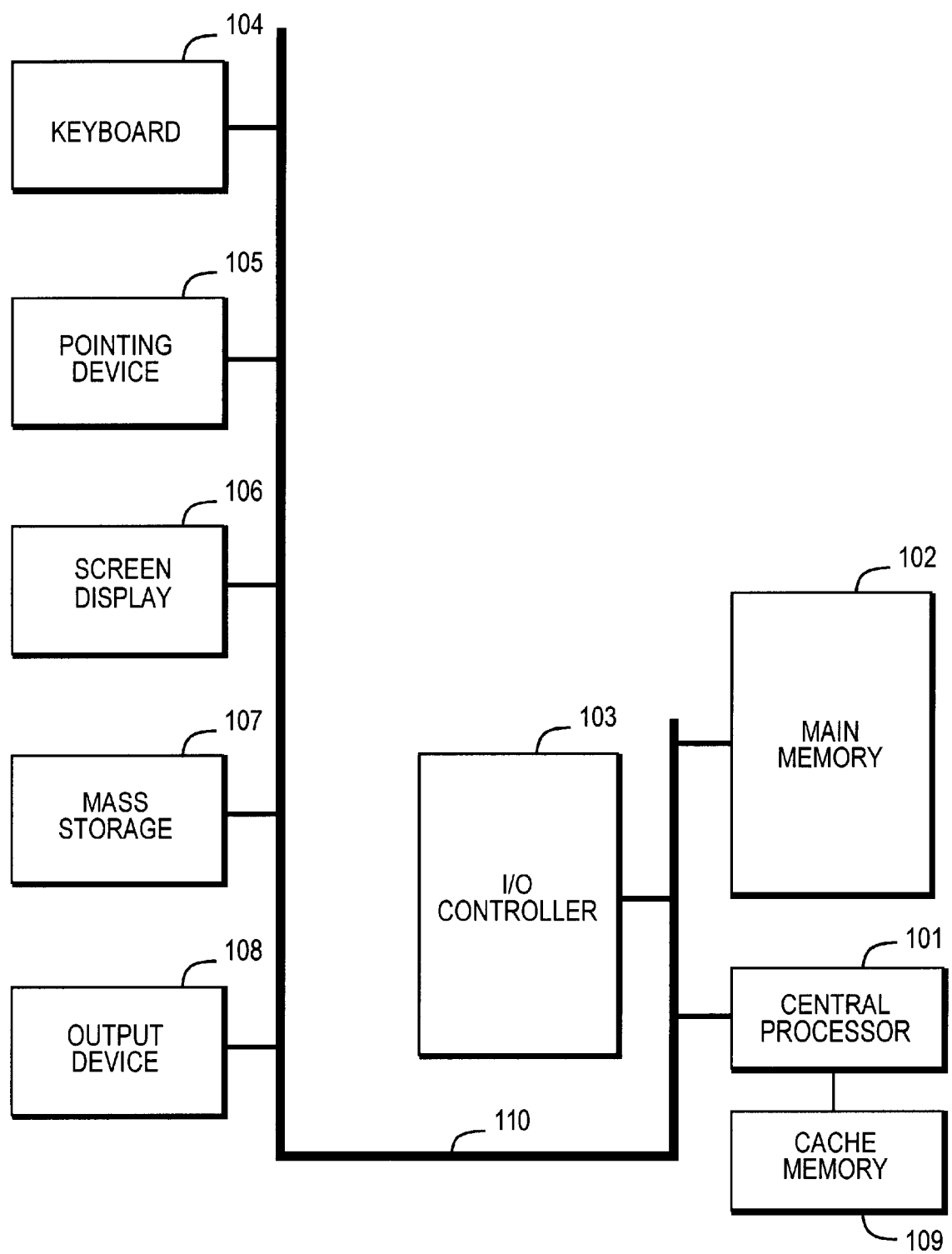
FIG. 1A is a block diagram illustrating a computer system in which the present invention may be embodied.

The invention may be embodied on a computer system such as the system 100 of FIG. 1A, which comprises a central processor 101, a main memory 102, an input/output (I/O) controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes, or is coupled to, a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

System Software

Figure 1B:
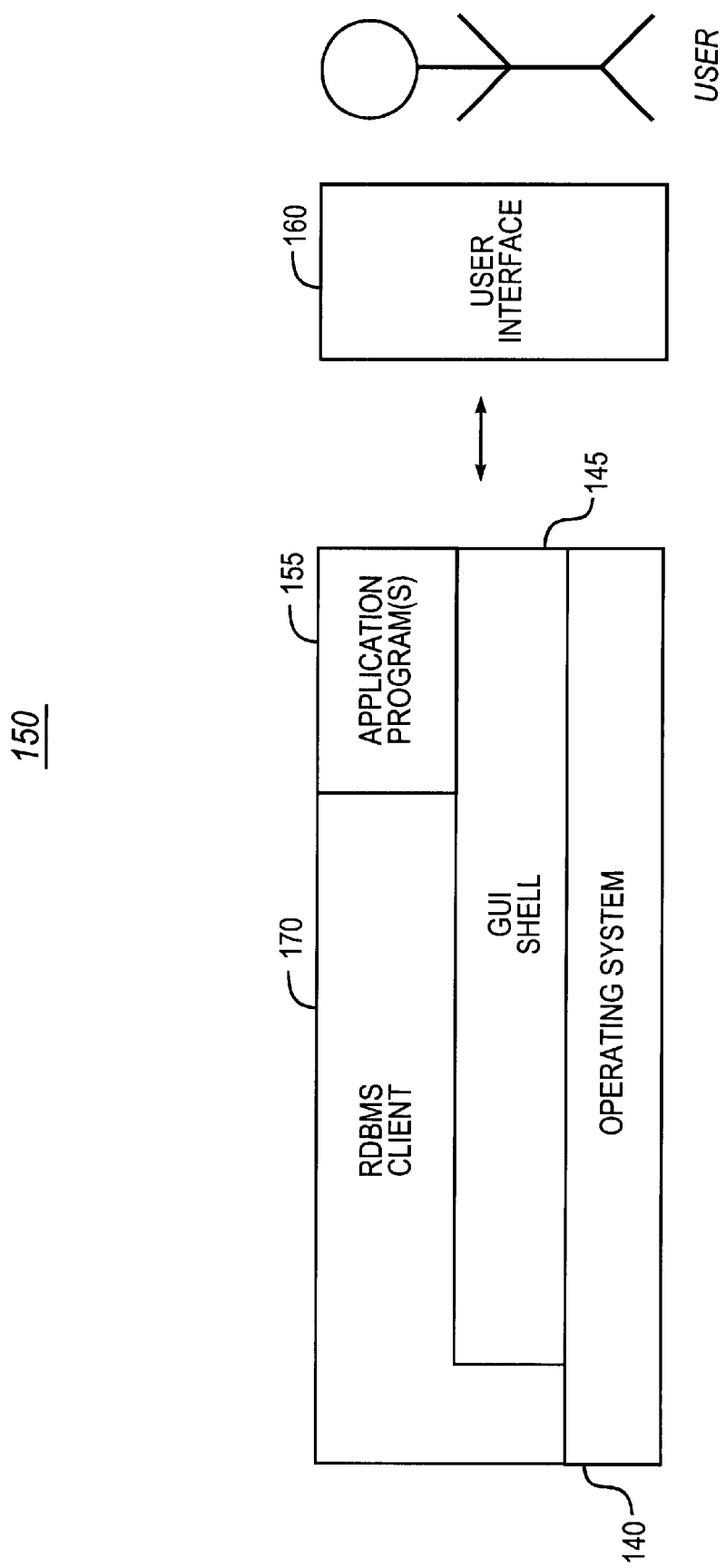
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system or main memory 102 and on mass storage or disk memory 107, includes a kernel or operating system (OS) 140 and a GUI (graphical user interface) shell 145. One or more application programs, such as application software 155, may be "loaded" (i.e., transferred from mass storage 107 into main memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder®, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing SQL database server tables in a client/server environment. Operating system 140 and accompanying GUI shell 145 may be provided by any one of a number of available GUI/operating systems, including, for instance, Microsoft Windows 2000 (Microsoft Corp. of Redmond, Wash.), Linux (available from various vendors), UNIX (Novell of Provo, Utah), and Macintosh (Apple Computers of Cupertino, Calif.).

Client/Server Database Management System

Figure 2:
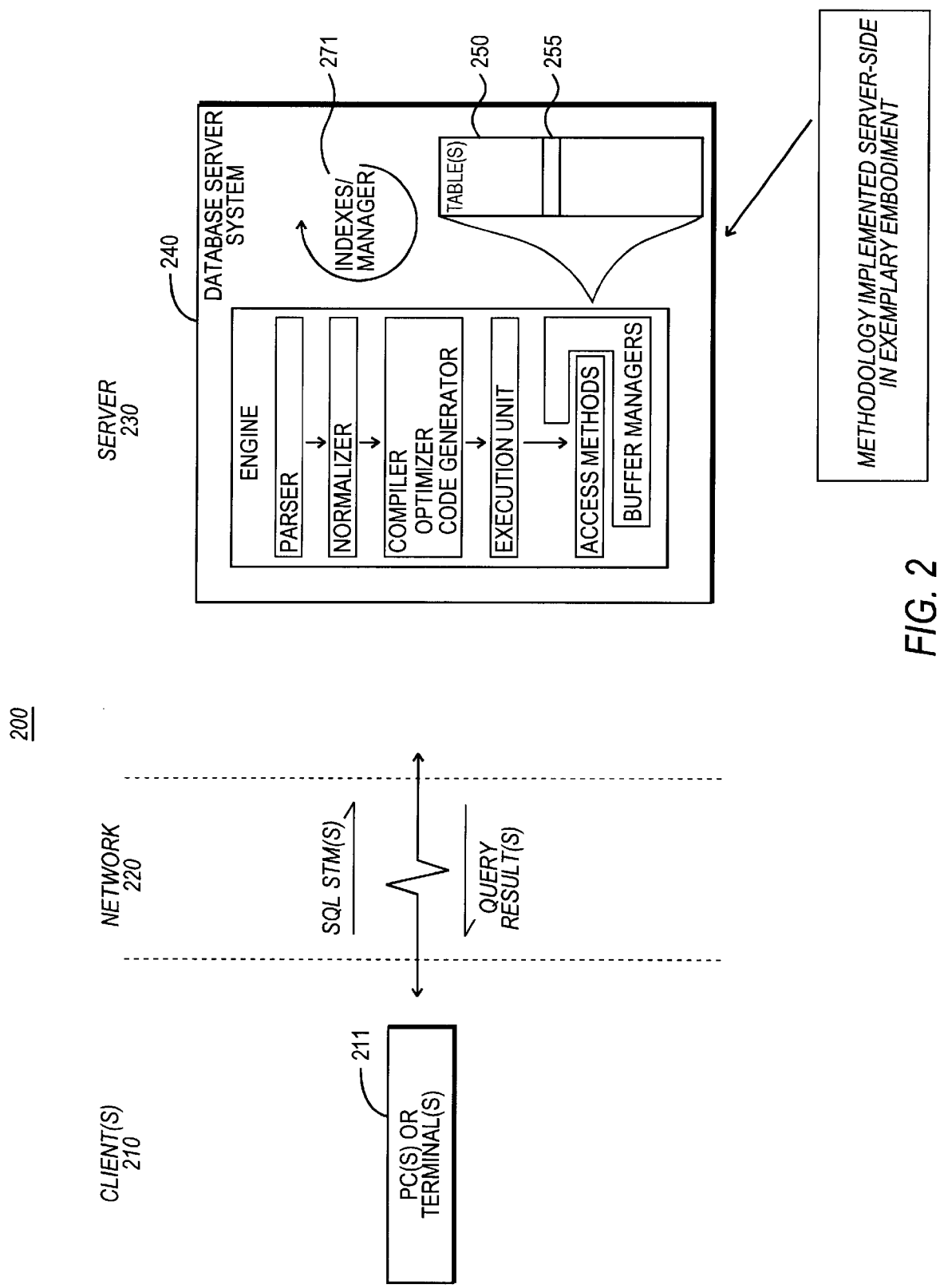
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows client operating system (e.g., Microsoft Windows 95/98, or Microsoft Windows 2000).

The Database Server System 240, which comprises Sybase® Adaptive Server® IQ (available from Sybase, Inc. of Emeryville, Calif.) in an exemplary embodiment, generally operates as an independent process (i.e., independently of the clients), running under a server operating system such as Microsoft Windows 2000 (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server System 240.

Client/server environments, database servers, and networks are well documented in the technical, trade, and patent literature. For a discussion of database servers and client/server environments generally and Sybase architecture particularly, see, e.g., Nath, A., *The Guide to SQL Server*, Second Edition, Addison-Wesley Publishing Company, 1995. For a description of Sybase® Adaptive Server® IQ, see, e.g., *Adaptive Server IQ 12.4.2 Product Documentation*, which includes the following: (1) *Adaptive Server Anywhere Programming Interfaces Guide*, (2) *Adaptive Server IQ Administration and Performance Guide*, (3) *Introduction to Adaptive Server IQ*, (4) *Adaptive Server IQ Multiplex User's Guide*, (5) *Adaptive Server IQ Reference Manual*, and (6) *Adaptive Server IQ Troubleshooting and Error Messages Guide*, all available from Sybase, Inc. of Emeryville, Calif. (and currently available via the Internet at http://sybooks.sybase.com/iq.html). The disclosures of the foregoing are hereby incorporated by reference.

In operation, the Client(s) 210 store data in, or retrieve data from, one or more database tables 250, shown in FIG. 2. Typically resident on the Server 230, each table itself comprises one or more rows or "records" (tuples) (e.g., row 255), each storing information arranged by columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table(s) 250. The syntax of SQL (Structured Query Language) is well documented; see, e.g., the above-mentioned *An Introduction to Database Systems*. In addition to retrieving the data from Database Server tables, the Clients also include the ability to insert new rows of data records into the table; Clients can also modify and/or delete existing records in the table(s).

For enhancing the speed in which the Database Server stores, retrieves, and presents particular data records, the Server maintains one or more database indexes 271 (operating under control of an index manager) on the table(s). A database index, such as a B-Tree data structure, allows the records of a table to be organized in many different ways, depending on a particular user's needs. For example, a B-Tree index may be constructed as a single disk file storing index key values together with unique record numbers, arranged within a hierarchical (tree) data structure. Each key value is a data quantity composed of one or more fields from a record; the values are used to arrange (logically) the database file records by some desired order (index expression). The unique record numbers or IDs are unique pointers or identifiers to the actual storage location of each record in the database file. Both are referred to internally by the system for locating and displaying records in a database file. The ability to sort information, whether for re-ordering the records or for creating a sorted index, is crucial to the performance of database systems.

Improved Dating Indexing Methodology and Query Processing

A. Date Index (DateIndex)

A bitmap is the principal data structure employed in a specialized data index—the DateIndex—of the present invention. To represent a date having year, month, and date components, three different groups of bitmaps are employed. Each bitmap within a given group may be defined to be an infinite array (bit[ ]) of bits, with any given bit "i" having a value of 0 or 1, only. A bitmap may be used to identify which rows in a database table have a particular value X. For example, to track rows that have a value 5, as one inserts values into a given database table for each row "i" that has a value 5, one may set bit[i]=1.

A date value may be decomposed into individual year (y), month (m), and day (d) components. Within a database system, dates have the following characteristics.

Range of 12 months maximum

Range of 31 days maximum

Range of N years (N not necessarily known a priori)

A DateIndex index data structure of the present invention is defined to comprise three distinct groups of bitmaps: one for years, another for months, and another for days, respectively. This index can be created on a column having a datatype of "date" (e.g., standard SQL datatype which stores date literals), or information which is translatable into a "date" datatype.

Consider, for instance, a database table with a single column C with an accompanying DateIndex index on that column. The month group contains exactly 12 bitmaps, call them M[1], M[2], ..., M[12], to track rows in column C containing month ranges for that column. The month group tracks month ranges for rows in a given table as follows.

M[1] tracks rows in table that have dates containing months 1 through 12, inclusive M[2] tracks rows in table that have dates containing months 2 through 12, inclusive M[3] tracks rows in table that have dates containing months 3 through 12, inclusive ...

M[12] tracks rows in table that have dates containing months 12 through 12, inclusive As shown, each successive bitmap stores a successively smaller subrange of possible month values (e.g., months 1–12, months 2–12, months 3–12, and so forth and so on). M[1] contains a 0 for row 'i' when the value of row 'i' is NULL. Those skilled in the art will appreciate that the actual assignment of a given range (or subrange) to a particular bitmap may be varied, if desired; for instance, the first bitmap may be defined to track rows in the table that have dates containing months 12 through 12, inclusive, while the last bitmap may be defined to track rows in the table that have dates containing months 1 through 12, inclusive. The above-specified assignment, however, represents the currently-preferred embodiment.

The day group contains exactly 31 bitmaps, call them D[1], D[2], ..., D[31], to track rows in column C containing ranges of days for that column. In a manner similar to that described above for the month group, the day group is employed as follows.

D[1] tracks rows in table that have dates containing days 1 through 31, inclusive D[2] tracks rows in table that have dates containing days 2 through 31, inclusive D[3] tracks rows in table that have dates containing days 3 through 31, inclusive ...

D[31] tracks rows in table that have dates containing days 31 through 31, inclusive Again, each successive bitmap stores a successively smaller subrange of possible values. D[1] contains a 0 for row 'i' when the value of row 'i' is NULL. If desired, the exact mapping of a given range to a given bitmap may be altered (e.g., as described above).

Continuing in this manner, the year group contains N bitmaps (call them Y[1], Y[2], ..., Y[N]) to track rows in column C containing ranges of years. N is the number of distinct years. Suppose a given database table contains dates with years 1997, 1999, and 2000. In such a case, N=3 and one has the following.

Y[1] tracks rows in table that have dates containing years 1997, 1999, and 2000, inclusive Y[2] tracks rows in table that have dates containing years 1999, and 2000, inclusive Y[3] tracks rows in table that have dates containing years 2000, inclusive As before, each successive bitmap stores a successively smaller subrange of possible values, in this case, year date values. Y[1] contains a 0 for row 'i' when the value of row 'i' is NULL. Note for the example dates above (i.e., 1997, 1999, and 2000), there is no bitmap containing the year range starting with 1998 since there are no rows in column C containing date values consisting of that year. In other words, no bitmap is employed to represent the subrange of 1998–2000, as there are no 1998 year date values. If desired, the particular mapping of a given year range to a given bitmap may be altered, as previously described.

Finally, in accordance with the present invention, an "existence bitmap" (EBM) is used to track whether particular rows exist (with regards to a particular record identifier (RecordID)) in the column C. Here, EBM[i]=1 means row with RecordID 'i' exists; 0, of course, means the row with RecordID 'i' does not exist.

If desired, the bitmaps (or any subset combination thereof) may be compressed. The actual compression methodology used can be provided by one of the many commercially-available compression/decompression libraries, such as LZS221 (available from Stac Electronics of San Diego, Calif.), which is described in U.S. Pat. Nos. 4,701,745, 5,016,009, 5,126,739, and 5,146,221. LZRW1, a similar methodology, can be employed; see, e.g., Williams, Ross, An Extremely Fast Data Compression Algorithm, Proceedings from IEEE Computer Society Data Compression Conference, Snowbird, Utah, April 1991. Alternatively, LZW compression/decompression, which is described in U.S. Pat. No. 4,558,302, may be employed; or PKZIP compression/decompression (available from PKW are of Brown Deer, Wis.), which is described in U.S. Pat. No. 5,051,745, may be employed. The disclosures of each of the foregoing are hereby incorporated by reference.

B. Query Processing

Use of the above-defined DateIndex structures and accompanying methodology will now be demonstrated for query processing. Consider, for instance, queries involving a single date (query condition). A date value and the desired operation (i.e., comparison operation) is given to a DateIndex processing module of the present invention, which implements methodology for processing the above-defined DateIndex bitmap index structures. The DateIndex module takes the supplied date value and breaks it into its year, month, and day components (y, m, d). Armed with this information, the system can now resolve a desired query operation using set algebra as described below.

1. "Equal to" Operation: EQ (=)

Consider, for instance, a query predicate (i.e., (sub) expression that may be either true or false) involving an "equal to" operation. The "equal to" (EQ) operation may be reduced to the following.

$$EQ = (Y[y] - Y[y+1]) \cap (M[m] - M[m+1]) \cap (D[d] - D[d+1])$$

(where $\cap$ indicates set intersection—logical "and" operation)

As shown, the determination is made by the intersection of a qualifying year (temporary) result set, a qualifying month (temporary) result set, and a qualifying day (temporary) result set. The qualifying year result set is determined by taking the year (subrange) bitmap that includes the current year date value (e.g., the 1997–2000 bitmap for a year date value of 1997) and subtracting out the next subsequent year (subrange) bitmap (e.g., the 1999 bitmap, for the previously-described example). In a similar fashion, the qualifying month result set is determined by taking the month (subrange) bitmap that includes the current month date value (e.g., the month 3–12 bitmap for a month date value of March) and subtracting out the next subsequent month (subrange) bitmap (e.g., the month 4–12 bitmap). Continuing in this manner, the qualifying day result set is determined by taking the day (subrange) bitmap that includes the current day date value (e.g., the day 15–31 bitmap for a day date value of the 15th) and subtracting out the next subsequent day (subrange) bitmap (e.g., the day 16–31 bitmap). The intersection of these (temporary) result sets (e.g., logical AND) yields a final result set of records that satisfy the "equal to" condition.

Numerous optimizations are possible for a given set of data. If any of the following conditions are true, one or more of the "set difference" operations can be eliminated.

month=12 day=last day of month year=largest year value year does not exist

For instance, for EQ, for a date value where month=12, $M[m]-M[m+1]$ reduces to simply $M[m]$. In a similar fashion, for EQ and a date value where day=31, $D[d]-D[d+1]$ reduces to $D[d]$. For EQ, for a date value where the year doesn't exist, the entire set algebra equation reduces to the empty set. For an "equal to" operation, the minimum number of bitmap operations is two, and the maximum number is five.

2. Not Equal to Operation: NE (!=)

A "not equal to" (NE) operation may be reduced to the following.

$$NE=EBM-EQ$$

As shown, the NE result sets (of qualifying rows) may be simply determined by subtracting the EQ result set from the existing rows (EBM). The above-described optimizations for an EQ operation also apply here as well. For a "not equal to" operation, the minimum number of bitmap operations is three, and the maximum is six.

3. Greater than Operation: GT(>)

A "greater than" (GT) operation may be reduced to the following.

$$GT=Y[Y+1] \cup ((Y[y]-Y[y+1]) \cap M[m+1]) \cup ((Y[y]-Y[y+1]) \cap (M[m]-M[m+1]) \cap D[d+1])$$

(where ∪ indicates set union—logical "or" operation)
This can be simplified to the following using set algebra distributive laws.

$$GT=Y[y+1] \cup ((Y[y]-Y[y+1]) \cap (M[m+1] \cup ((M[m]-M[m+1]) \cap D[d+1])))$$

Here, the maximum number of bitmap operations is six.

As shown, the determination of GT is made by the union of three temporary result sets. Consider a given date value with a year YY, month MM, and day DD. The first temporary result set determines the years greater than YY ($Y[y+1]$). This qualifying result set is determined by taking the year subrange greater than the one for the current date value (e.g., the 1999 bitmap for a current date value with year 1997, for the previously-described example).

Similarly, the second temporary result set determines the months in the current year greater than MM. This qualifying temporary result set is determined by taking the year (subrange) bitmap that includes the current year date (e.g., 1997–2000 bitmap for a year date value of 1997) and subtracting out the next subsequent year (subrange) bitmap (e.g., the 1999 bitmap, for the previously-described example) and intersecting this result with the month (subrange) bitmap for the next month (e.g., the 4–12 month bitmap if the current date value has a month date value of March).

Lastly, the third temporary result set determines the days in the current year and month greater than DD. This qualifying temporary result set is determined by taking the year (subrange) bitmap that includes the current year date (e.g., 1997–2000 bitmap for a year date value of 1997) and subtracting out the next subsequent year (subrange) bitmap (e.g., the 1999 bitmap, for the previously-described example); intersecting this result with another result set obtained by taking the month (subrange) bitmap that includes the current month (e.g., the month 3–12 bitmap for a month date value of March) and subtracting out the next subsequent month (subrange) bitmap (e.g., the month 4–12 bitmap); and lastly intersecting this result with the day (subrange) bitmap for the next day (e.g, the 15–31 day bitmap if the current date value has day 14). Finally, the union (logican "OR") of these three temporary result sets yields a final result set of records that satisfy the "greater than" condition.

Again, numerous optimizations are possible (for the data characteristics indicated below), thereby allowing elimination of one or more operations.

month=12 and day=31 day=last day of month year=largest year

For GT, for a date value where month=12 and day=31, the set algebra equation reduces to simply $Y[y+1]$. For GT, for a date value where year is the largest year, the set algebra equation reduces to simply:

$$Y[y] \cap (M[m+1] \cup ((M[m]-M[m+1]) \cap D[d+1]))$$

For GT, for a date value where the day equals the last day of the month, the set algebra equation reduces to simply:

$$Y[y+1] \cup ((Y[y]-Y[y+1]) \cap M[m+1])$$

4. Greater than or Equal to Operation: GE (>=)

A "greater than or equal to" (GE) operation may be reduced to the following.

$$GE=Y[y+1] \cup ((Y[y]-Y[y+1]) \cap M[m+1]) \cup ((Y[y]-Y[y+1]) \cap (M[m]-M[m+1]) \cap D[d])$$

This can be simplified to the following using set algebra distributive laws.

$$GE=Y[y+1] \cup ((Y[y]-Y[y+1]) \cap (M[m+1] \cup ((M[m]-M[m+1]) \cap D[d])))$$

As shown, the determination of GE is made by the union of three temporary result sets. Consider a given date value with a year YY, month MM, and day DD. The first temporary result set determines the years greater than or equal to YY ($Y[y+1]$). This qualifying result set is determined by taking the year subrange greater than the one for the current date value (e.g., the 1999 bitmap for a current date value with year 1997, for the previously-described example).

Similarly, the second temporary result set determines the months in the current year greater than MM. This qualifying temporary result set is determined by taking the year (subrange) bitmap that includes the current year date (e.g., 1997–2000 bitmap for a year date value of 1997) and subtracting out the next subsequent year (subrange) bitmap (e.g., the 1999 bitmap, for the previously-described example) and intersecting this result with the month (subrange) bitmap for the next month (e.g, the 4–12 month bitmap if the current date value has a month date value of March).

Lastly, the third temporary result set determines the days in the current year and month greater than DD. This qualifying temporary result set is determined by taking the year (subrange) bitmap that includes the current year date (e.g., 1997–2000 bitmap for a year date value of 1997) and subtracting out the next subsequent year (subrange) bitmap (e.g., the 1999 bitmap, for the previously-described example); intersecting this result with another result set obtained by taking the month (subrange) bitmap that includes the current month (e.g., the month 3–12 bitmap for a month date value of March) and subtracting out the next subsequent month (subrange) bitmap (e.g., the month 4–12 bitmap); and lastly intersecting this result with the day (subrange) bitmap for the current day (e.g, the 14–31 day bitmap if the current date value has day 14). Finally, the union (logical "OR") of these three temporary result sets yields a final result set of records that satisfy the "greater than" condition.

Again, numerous optimizations apply here.

month=1 and day=1 year=largest year month=12

For GE, for a date value where month=12, the set algebra equation reduces to simply:

$$Y[y+1] \cup ((Y[y]-Y[y+1]) \cap (M[m] \cap D[d]))$$

For GE, for a date value where year equals the largest year, the set algebra equation reduces to simply:

$$Y[y] \cap (M[m+1] \cup ((M[m]-M[m+1]) \cap D[d]))$$

For GE, for a date value where month=1 and day=1, the set algebra equation reduces to simply Y[y]. The maximum number of bitmap operations is six.

5. Less than Operation: LT (<)

The "less than" (LT) operation is defined in terms of the preceding ones, as follows.

$$LT=EBM-GE$$

As shown, the LT result set (of qualifying rows) may be simply determined by subtracting the GE result set from the existing rows (EBM). The GE optimizations apply here as well. Here, the maximum number of bitmap operations is seven.

6. Less than or Equal to Operation: LE (<=)

The "less than or equal to" (LE) operation is defined in terms of the preceding ones.

$$LE=EBM-GT$$

As shown, the LE result set (qualifying rows) may be simply determined by subtracting the GT result set from the existing rows (EBM). The GT operations apply here. The maximum number of bitmap operations is seven.

C. Range Query Processing

Now consider range queries. A range query involves two dates and an operation to perform on each date, such as Date1>X and Date2<Y. For the foregoing example, the two date values are X and Y, and the operations to perform are >and <, respectively. A more complicated query involving multiple date ranges, such as (Date1>=X and Date2<Y) OR (Date3>=Q and Date4<=R), can be handled very easily as well. The intermediate result set (of qualifying rows) for the first condition (e.g., Date1>=X and Date2<Y for the preceding example) is "unioned" (logical "or") with the intermediate result set (of qualifying rows) for the second condition (e.g., Date3>=Q and Date4<=R for the preceding example) yielding a final result set of records that satisfies the "OR" condition. This approach allows us to handle any combination of date ranges appearing in a query. Intermediate result bitmaps are retained for bitwise combination with other intermediate result bitmaps, as appropriate, for a given query.

Range operations are simply a combination of the preceding operations as indicated below.

Date1>=X and Date2<=Y: GE∩LE

Date1>=X and Date2<Y: GE∩LT

Date1>X and Date2<Y: GT∩LT

Date1>X and Date2<=Y: GT∩LE

The maximum number of bitmap operations is 14.

Numerous optimizations are possible by recognizing patterns, including the following.

(1) Whole Year Combinations

Date1>=1997-01-01 AND Date2<=1997-12-31

Date1>=1997-01-01 AND Date2<1998-01-01

Date1>1996-12-31 AND Date2<=1997-12-31

Date1>1996-12-31 AND Date2<1998-01-01

Each of these requires a single bitmap operation; here, use of month and day bitmaps is eliminated.

(2) Whole Year-month Combinations

Date1>=Year1-Mon1-01 AND Date2<Year2-Mon2-01

Date1>=Year1-Mon1-01 AND Date2<=Year2-Mon2-LastDayOfMon2

Date1>Year1-Mon1-LastDayOfMon1 AND Date2<Year2-Mon2-01

Date1>Year1-Mon1-LastDayOfMon1 AND Date2<=Year2-Mon2-LastDayOfMon2

With whole year-month combinations, the use of day bitmaps is eliminated.

D. Cost Summary

The following chart summarizes the worst case bitmap operation cost of an HNG index versus the DateIndex of the present invention, for each of the operations that must be provided for query processing.

TABLE 1

|  | EQ | NE | LT | LE | GT | GE | Range |
|---|---|---|---|---|---|---|---|
| HNG | 32 | 32 | 32 | 32 | 32 | 32 | 64 |
| DateIndex | 5 | 6 | 7 | 7 | 6 | 6 | 14 |

As can be seen from the above table, the DateIndex technique provides superior query performance over the existing HNG index based on bitmap operation cost alone.

E. Examples

The following illustrates how the DateIndex works in particular query examples. For purposes of the examples which follow, it is assumed that one has loaded the given dates (shown below) into a database table and the RowID (row identifier) column shows the particular row number assigned to the given date value. Hence, date value 1998/04/11 was loaded into row 2.

Date Values RowID (YYYY/MM/DD)
1997/03/10 1
1998/04/11 2
1997/03/11 3
1997/03/21 4
1998/03/10 5
1997/01/01 6
1998/01/01 7
1997/12/31 8
1999/01/22 9
1999/01/21 10
1999/01/20 11
1997/05/01 12
1997/05/31 13
1998/04/12 14

The bitmap contents are shown below.

EBM={1,2,3,4,5,6,7,8,9,10,11,12,13,14}
Y[1997]={1,2,3,4,5,6,7,8,9,10,11,12,13,14}
Y[1998]={2,5,7,9,10,11,14}
Y[1999]={9,10,11}
M[1]={1,2,3,4,5,6,7,8,9,10,11,12,13,14} M[7]={8}
M[2]={1,2,3,4,5,8,12,13,14} M[8]={8}
M[3]={1,2,3,4,5,8,12,13,14} M[9]={8}
M[4]={2,8,12,13,14} M[10]={8}
M[5]={8,12,13} M[11]={8}
M[6]={8} M[12]={8}
D[1]={1,2,3,4,5,6,7,8,9,10,11,12,13,14} D[17]={4,8,9,10,11,13}
D[2]={1,2,3,4,5,8,9,10,11,13,14} D[18]={4,8,9,10,11,13}
D[3]={11,2,3,4,5,8,9,10,11,13,14} D[19]={4,8,9,10,11,13}
D[4]={1,2,3,4,5,8,9,10,11,13,14} D[20]={4,8,9,10,11,13}
D[5]={1,2,3,4,5,8,9,10,11,13,14} D[21]={4,8,9,10,13}
D[6]={1,2,3,4,5,8,9,10,11,13,14} D[22]={8,9,13}
D[7]={1,2,3,4,5,8,9,10,11,13,14} D[23]={8,13}
D[8]={1,2,3,4,5,8,9,10,11,13,14} D[24]={8,13}
D[9]={1,2,3,4,5,8,9,10,11,13,14} D[25]={8,13}
D[10]={1,2,3,4,5,8,9,10,11,13,14} D[26]={8,13}
D[11]={2,3,4,8,9,10,11,13,14} D[27]={8,13}
D[12]={4,8,9,10,11,13,14} D[28]={8,13}
D[13]={4,8,9,10,11,13} D[29]={8,13}
D[14]={4,8,9,10,11,13} D[30]={8,13}
D[15]={4,8,9,10,11,13} D[31]={8,13}
D[16]={4,8,9,10,11,13}

Given these bitmaps, now one can see how to use them to evaluate various query requests.

a) $X = 1997/03/21$ $= (Y[1997] - Y[1998]) \cap (M[3] - M[4]) \cap (D[21] - D[22])$ $= (\{1, 2, 3, 4, 5, 6, 7, 8, 9, 10, 11, 12, 13, 14\} -$ $\{2, 5, 7, 9, 10, 14\}) \cap (\{1, 2, 3, 4, 5, 8, 12, 13, 14\} -$ $\{2, 8, 12, 13, 14\}) \cap (\{4, 8, 9, 10, 13\} - \{8, 9, 13\})$ $= \{1, 3, 4, 6, 8, 11, 12, 13\} \cap \{1, 3, 4, 5\} \cap \{4, 10\}$ $= \{4\}$ Only row 4 contains the value 1997/03/21.

b) $X \mathrel{!=} 1997/03/21$. Using the preceding example, one need only do one additional operation.

$= EBM - \{4\}$ $= \{1, 2, 3, 4, 5, 6, 7, 8, 9, 10, 11, 12, 13, 14\} - \{4\}$ $= \{1, 2, 3, 5, 6, 7, 8, 9, 0, 11, 12, 13, 14\}$

All rows except row 4 have values not equal to 1997/03121.

c) $X > 1998/04/11$ $= Y[1999] \cup ((Y[1998] - Y[1999]) \cup M[5]) \cup$ $((Y[1998] - Y[1999]) \cap (M[4] - M[5]) \cap (D[12]))$ $= \{9, 10, 11\} \cup (\{2, 5, 7, 9, 10, 14\} - \{9, 10, 11\}) \cap$ $\{8, 12, 13\}) \cup ((\{2, 5, 7, 9, 10, 14\} - \{9, 10, 11\}) \cap$ $(\{2, 8, 12, 13, 14\} - \{8, 12, 13\}) \cap \{4, 8, 9, 10, 11, 13, 14\}$ $= \{9, 10, 11\} \cup (\{2, 5, 7, 14\} \cap \{8, 12, 13\}) \cup (\{2, 5, 7, 14\} \cap$ $\{2, 14\} \cap \{4, 8, 9, 10, 11, 13, 14\})$ $= \{9, 10, 11, 14\}$ Only rows 9, 10, 11, 14 have values greater than *1998/04/11*.

d) $X \leq 1998/04/11$ $= EBM - \{9, 10, 11, 14\}$ (from > case above)

$= \{1, 2, 3, 4, 5, 6, 7, 8, 12, 13\}$ e) $X \geq 1998/04/11$ $= Y[1999] \cup ((Y[1998] - Y[1999]) \cap M[5]) \cup$ $((Y[1998] - Y[1999]) \cap (M[4] - M[5]) \cap (D[11]))$ $= \{9, 10, 11\} \cup (\{2, 5, 7, 9, 10, 14\} - \{9, 10, 11\}) \cap$ $\{8, 12, 13\}) \cup ((\{2, 5, 7, 9, 10, 14\} - \{9, 10, 11\}) \cap$ $(\{2, 8, 12, 13, 14\} - \{8, 12, 13\}) \cap$ $\{2, 3, 4, 8, 9, 10, 11, 13, 14\}$ $= \{9, 10, 11\} \cup (\{2, 5, 7, 14\} \cap \{8, 12, 13\}) \cup$ $(\{2, 5, 7, 14\} \cap \{2, 14\} \cap \{2, 3, 4, 8, 9, 10, 11, 13, 14\})$ $= \{2, 9, 10, 11, 14\}$ Rows 2, 9, 10, 11, 14 have values greater than or equal to 1998/04/11.

f) $X < 1998/04/11$ $= EBM - \{2, 9, 10, 11, 14\}$ (from >= case above)

$= \{1, 3, 4, 5, 6, 7, 8, 12, 13\}$ g) $X \geq 1997/01/01$ and $X < 1998/04/11$ $= \{1, 2, 3, 4, 5, 6, 7, 8, 9, 10, 11, 12, 13, 14\}$ $C\{1, 3, 4, 5, 6, 7, 8, 12, 13\}$ $= \{1, 3, 4, 5, 6, 7, 8, 12, 13\}$

F. Experimental Results

Query times for the DateIndex of the present invention have been compared against query times for the HNG and HG indexes. The experiment consisted of queries against a table having a single date column containing 100 million random dates. The experiment measured elapsed time, disk I/O and LRU (least-recently used) lock contention. All experiments were done using a cold cache in ASIQ. The results obtained are summarized below.

a) select count(*) from foo where c1='1990/12/15' (29160 rows)

|  | Elapsed Time (secs) | disk I/O (KB) | LRU Locks |
| --- | --- | --- | --- |
| HNG | 29.2 | 172196 | 52328 |
| DateIndex | 26.7 | 49548 | 11639 |
| HG | 1 | 516 | 212 | b) select count(*) from foo where c1>='1993/03/10' (68059910 rows)

|  | Elapsed Time (secs) | disk I/O (KB) | LRU Locks |
| --- | --- | --- | --- |
| HNG | 38.5 | 172240 | 43740 |
| DateIndex | 14.6 | 61852 | 20682 |
| HG | 200 | 100112 | 38170 | c) select count(*) from foo where c1>='1993/03/10' and c1<'1996/08/04' (33986270 rows)

|  | Elapsed Time (secs) | disk I/O (KB) | LRU Locks |
| --- | --- | --- | --- |
| HNG | 63.7 | 172024 | 50338 |
| DateIndex | 38.6 | 123156 | 40810 |
| HG | 211 | 106460 | 40471 |

As shown by the above results, one can easily see that the DateIndex approach outperforms the HNG index with regards to elapsed time, significantly less disk I/O, and greatly reduced LRU lock contention.

G. Source Code Implementation

In accordance with the present invention, a method for finding database records meeting a "greater than or equal to" (GTE) condition may be constructed as a FindGTE method, as shown in the following C-like pseudocode (line numbers added for convenience of description).

```
 1: //
 2: // Arguments
 3: //
 4: //    value - date value provided by caller
 5: //    fset - bitmap which will contain the row numbers
 6: //        for rows in this column that have date
 7: //        values greater than or equal to 'value'
 8: //
 9: void DateIndex::FindGTE(date *DateValue, bitmap *fset)
10: {
11: bitmap b1, b2;
12:     int y, m, d;
13:
14: //
15: // From the supplied date, extract its constituent year,
16: // month, and day components.
17: //
18:     y = DateValue->GetYEAR();
19:     m = DateValue->GetMONTH();
20:     d = DateValue->GetMDAY();
21:
22: //
23: // If we are looking at the first month of the year and
24: // the first day of that month, then the answer to the query
25: // is simply the bitmap containing the range for the desired
26: // year.
27: if (m == 1 && d == 1) {
28:     *fset = *year[y];
29: //
30: // Otherwise, we must handle this slightly more complicated
31: // case. We take into account the identified optimizations
32: // for situations like last year known and last month of the
33: // year.
34: //
35: } else {
36: //
37: // If we are not looking at the last year known, then we must
38: // compute the set intersection of years in order to have
39: // the appropriate filter to apply to the month and
40: // day set operations.
41: //
42:     if (y == largest_year)
43:         b1 = *year[y];
44:     else
45:         b1.AssignXTurnOffY(*year[y], *year[y+1]);
46: //
47: // If not at last month of the year, then need to determine month
48: // filter to apply to the days.
49: //
50:     if (m != 12) {
51:         b2.AssignXTurnOffY(*month[m], *month[m+1]);
52:         b2 &= *day[d];
53:         b2 |= *month[m];
54:     { else }
55:         b2.And(*month[m], *day[d]);
56:     }
57:
58:     b1 &= b2;
59:
60:     if (y != largest_year)
61:         fset->Or(b1, *year[y+1]);
62:     else
63:         *fset |= b1;
64: }
65: //
66: // All done. Final answer in 'fset' which is returned
67: // to the caller.
68: //
69: }
```

Upon invocation with a date value, the method operates as follows. First, the method decomposes the supplied date value into year (y), month (m), and day (d) components, as shown at lines 15–20. If the date value under examination specifies the first month of the year and the first day of that month (e.g., date value of '2000/01/01'), then the answer to the query is simply the bitmap containing the range for the desired year. This optimization is shown at lines 23–28. Otherwise, the method must handle a slightly more complicated case, taking into account the previously-identified optimizations for situations like last year known and last month of the year. In that case, the "else" statement beginning at line 35 is triggered. Operation of the "else" statement proceed as follows. If the method is not examining the last year known, then the method computes a set intersection of years in order to determine the appropriate filter to apply to the month and day set operations. This logic is shown at lines 37–45. If the method is not at the last month of the year, then the method needs to determine a month filter to apply to the days. This logic is shown at lines 47–64. After application of the foregoing filters, the final result may then be returned (as bitmap fset, which was passed to the method by reference).

A method for finding database records meeting a "less than" (LT) condition may be constructed as a FindLT method, as follows.

```
1: void DateIndex::FindLT(date *value, bitmap *fset)
2: {
3: //
4: // Very simple. Given we know all the rows that exist
5: // in the index, the answer to the query 'rows < value'
6: // will be the rows remaining after we subtract out those
7: // rows such that 'rows >= value.
8: //
9:    bitmap b1;
10:
11:   FindGTE(value, &b1);
12:   fset.AssignXTurnOffY(EBM, b1);
13: }
```

As shown, this is a simple case that may simply employ the previously-described FindGTE method, as part of its process. Given that one knows all the rows that exist in the index, the answer to the query rows <value will be the rows remaining after one subtracts out those rows such that rows>=value. This determination is shown at lines 11–12, with the FindGTE method being employed to find those rows having a value greater than or equal to (GTE) the passed-in date value under consideration. The remaining rows are returned as the answer bitmap (set), fset.

A method for finding database records meeting a "greater than" (GT) condition may be constructed as a FindGT method, as follows.

```
1: void DateIndex::FindGT(date *value, bitmap *fset)
2: {
3: // To compute the query 'rows > value', we answer it
4: // by restating the query as 'rows >= value+OneDay'.
5: //
6:    FindGTE(value+OneDay, fset);
7: }
```

Here, to compute a "greater than" result set, the FindGT method may simply invoke the FindGTE method, for a date value which is one day greater than the passed-in date value, as shown at the line 6.

A method for finding database records meeting a "less than or equal to" (LTE) condition may be constructed as a FindLTE method, as follows.

```
1: void DateIndex::FindLTE(date *value, bitmap *fset)
2: {
3: // To compute the query 'rows <= value', we find those
4: // rows query 'rows >value' (equivalent to 'rows >= value+OneDay')
5: // and subtract that answer from the set of all known
6: // rows for the index (aka the 'existence bitmap').
7: //
```

```
8:    bitmap b1;
10:   FindGTE(value+OneDay, &b1);
11:   fset.AssignXTurnOffY(EBM, b1);
12: }
```

For the FindLTE method, the FindGTE method is again invoked with a date value of one greater than that passed in (i.e., value+OneDay), this time for the purpose of finding a result set that may be subtracted from all known rows (i.e., the existence bitmap), as shown at lines 10–11. This yields a result set of all rows that are less than or equal to the passed-in value.

A method for finding database records meeting a defined date range condition (i.e., two date conditions) may be constructed as a Range method, as follows.

```
1: //
2: // op1, op2-    define the operations to do one
3: //             date values 'v1' and 'v2', respectively.
4: //
5: //             Operations are GT, GTE, LT, LTE which
6: //             represent >, >=, <, <=, respectively.
7: //
8: void DateIndex::Range(date *v1, date *v2, op1, op2)
9: {
10: // if doing a range operation such that
11: //
12: //    X >= v1 AND X < v2
13: //
14: // then resolve the query in the following steps
15: //
16: //   a) find GTE for v1
17: //   b) find GTE for v2
18: //   c) determine LT for v2
19: //   d) determine answer using (a) and (c)
20: //
21:    if (op1 == GTE and opt2 == LT) {
22:       FindGTE(v1, fset);       // step (a)
23:
24:       bitmap b2, b3;
25:       FindGTE(v2, &b2);         // step (b)
26:       b3.AssignXTurnOffY(EBM, &b2); // step (c)
27:
28:       fset &= b3;             // final answer
29:    } else {
30: //
31: // handle other range combinations
32: //
33:    }
34: }
```

As shown, the Range method is invoked with a pair of dates and corresponding operators for defining a date range. The range may be processed by simply breaking it into individual subranges, which are processed in a manner described above. The final result set is determined by combining the subranges (e.g., "ANDing" the two together). For instance, given a range operation such that X>=v1 AND X<v2, the query may be resolved by the following steps:

(a) find GTE for v1
    (b) find GTE for v2
    (c) determine LT for v2
    (d) determine answer using (a) and (c)

Other query ranges may be processed along similar lines, by applying the appropriate operators (i.e., GT, GTE, LT, and LTE).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system for representing information in database tables and for retrieving information from database tables in response to database queries, each database table comprising data records storing information categorized into one or more database columns, each database column storing information as an attribute having a particular data type, a method for creating a specialized date index for a particular database column storing date information, the method comprising:

creating a plurality of year bitmaps, wherein each year bitmap stores a successively smaller subrange of year values present in the particular database column;

creating a plurality of month bitmaps, wherein each month bitmap stores a successively smaller subrange of month values present in the particular database column;

creating a plurality of day bitmaps, wherein each day bitmap stores a successively smaller subrange of day values present in the particular database column;

creating an existence bitmap, for indicating whether a particular record exists for a given record identifier (record ID); and wherein upon receipt of a database query including date criteria that specifies selection of data records based at least in part on date values from said particular database column, the database system may determine a result set satisfying said date criteria by performing set operations on said bitmaps.

2. The method of claim 1, wherein said plurality of year bitmaps comprises no more than N number of bitmaps, for representing a range of N number of years present in said particular database column.

3. The method of claim 1, wherein said plurality of month bitmaps comprise no more than twelve bitmaps, for representing a range of twelve months maximum.

4. The method of claim 1, wherein said plurality of day bitmaps comprises no more than thirty-one bitmaps, for representing a range of thirty-one days maximum.

5. The method of claim 1, wherein said particular column stores information having an SQL date data type.

6. The method of claim 1, further comprising:

prior to construction of said specialized date index, decomposing each date value stored in said particular column into corresponding year, month, and day components.

7. The method of claim 1, wherein said bitmaps are grouped as follows: an array of year bitmaps for representing year information, an array of month bitmaps for representing month information, and an array of day bitmaps for representing day information.

8. The method of claim 7, wherein said array of month bitmaps comprises:

M[1] tracks rows of said database that have dates containing months 1 through 12, inclusive, M[2] tracks rows of said database that have dates containing months 2 through 12, inclusive, M[3] tracks rows of said database that have dates containing months 3 through 12, inclusive, through M[12] tracks rows of said database that have dates containing months 12 through 12, inclusive, such that each successive bitmap stores a successively smaller subrange of possible month values.

9. The method of claim 8, wherein bitmaps are eliminated for any month whose corresponding month value does not exist in the particular column.

10. The method of claim 7, wherein said array of day bitmaps comprises:

D[1] tracks rows of said database that have dates containing days 1 through 31, inclusive, D[2] tracks rows of said database that have dates containing days 2 through 31, inclusive, D[3] tracks rows of said database that have dates containing days 3 through 31, inclusive, through D[31] tracks rows of said database that have dates containing days 31 through 31, inclusive, such that each successive bitmap stores a successively smaller subrange of possible day values.

11. The method of claim 10, wherein bitmaps are eliminated for any day whose corresponding day value does not exist in the particular column.

12. The method of claim 1, further comprising:

applying compression to at least some of said bitmaps.

13. The method of claim 1, wherein the database system may determine a result set satisfying an "equal to" condition (EQ), as follows:

$$EQ = (Y[y] - Y[y+1]) \cap (M[m] - M[m+1]) \cap (D[d] - D[d+1])$$

where Y[y] specifies a particular year bitmap for year y, M[m] specifies a particular month bitmap for month m, D[d] specifies a particular day bitmap for day d, and where $\cap$ indicates set intersection.

14. The method of claim 13, wherein the database system may determine a result set satisfying a "not equal to" condition (NE), as follows:

$$NE = EBM - EQ$$

where EBM specifies said existence bitmap.

15. The method of claim 1, wherein the database system may determine a result set satisfying a "greater than" condition (GT), as follows:

$$GT = Y[y+1] \cup ((Y[y] - Y[y+1]) \cap M[m+1]) \cup ((Y[y] - Y[y+1]) \cap (M[m] - M[m+1]) \cap D[d+1])$$

where Y[y] specifies a particular year bitmap for year y, M[m] specifies a particular month bitmap for month m, D[d] specifies a particular day bitmap for day d, and where $\cap$ indicates set intersection and $\cup$ indicates set union.

16. The method of claim 1, wherein the database system may determine a result set satisfying a "greater than or equal to" condition (GE), as follows:

$$GE = Y[y+1] \cup ((Y[y] - Y[y+1]) \cap M[m+1]) \cup ((Y[y] - Y[y+1]) \cap (M[m] - M[m+1]) \cap D[d])$$

where Y[y] specifies a particular year bitmap for year y, M[m] specifies a particular month bitmap for month m, D[d] specifies a particular day bitmap for day d, and where $\cap$ indicates set intersection and $\cup$ indicates set union.

17. The method of claim 16, wherein the database system may determine a result set satisfying a "less than" (LT) operation, as follows:

$$LT = EBM - GE$$

where EBM specifies said existence bitmap.

18. The method of claim 16, wherein the database system may alternatively determine a result set satisfying a "greater than or equal to" condition (GE), as follows:

$$GE = Y[y+1] \cup ((Y[y] - Y[y+1]) \cap (M[m+1] \cup ((M[m] - M[m+1]) \cap D[d])))$$

where Y[y] specifies a particular year bitmap for year y, M[m] specifies a particular month bitmap for month m, D[d] specifies a particular day bitmap for day d, and where ∩ indicates set intersection and ∪ indicates set union.

19. The method of claim 15, wherein the database system may determine a result set satisfying a "less than or equal to" (LE) operation, as follows:

$$LE = EBM - GT$$

where EBM specifies said existence bitmap.

20. The method of claim 1, wherein the database system may determine a result set satisfying a date range criterion of Date1>=X and Date2<=Y, as follows:

$$GE \cap LE$$

where GE specifies an intermediate result set having date values greater than or equal to X, where LE specifies an intermediate result set having date values less than or equal to Y, and where ∩ indicates set intersection.

21. The method of claim 1, wherein the database system may determine a result set satisfying a date range criterion of Date1>=X and Date2<Y, as follows:

$$GE \cap LT$$

where GE specifies an intermediate result set having date values greater than or equal to X, where LT specifies an intermediate result set having date values less than Y, and where ∩ indicates set intersection.

22. The method of claim 1, wherein the database system may determine a result set satisfying a date range criterion of Date1>X and Date2<Y, as follows:

$$GT \cap LT$$

where GT specifies an intermediate result set having date values greater than X, where LT specifies an intermediate result set having date values less than Y, and where ∩ indicates set intersection.

23. The method of claim 1, wherein the database system may determine a result set satisfying a date range criterion of Date1>X and Date2<=Y, as follows:

$$GT \cap LE$$

where GT specifies an intermediate result set having date values greater than X, where LE specifies an intermediate result set having date values less than or equal to Y, and where ∩ indicates set intersection.

24. The method of claim 1, wherein each date value in the database system is stored as an integer value, which may be decomposed into year, month, and day components.

25. The method of claim 24, wherein each date value comprises a 32-bit integer value.

26. A database system with improved date indexing comprising:
one or more database tables, each database table comprising data records storing information categorized into one or more database columns, each database column storing information as an attribute having a particular data type;
an indexing module for creating a specialized date index for a particular database column storing date information, said indexing module creating:

(1) a plurality of year bitmaps, wherein each year bitmap stores a successively smaller subrange of year values present in the particular database column;

(2) a plurality of month bitmaps, wherein each month bitmap stores a successively smaller subrange of month values present in the particular database column;

(3) a plurality of day bitmaps, wherein each day bitmap stores a successively smaller subrange of day values present in the particular database column;

(4) an existence bitmap, for indicating whether a particular record exists for a given record identifier (record ID); and a query module for retrieving information from database tables in response to database queries, wherein upon receipt of a database query including date criteria that specifies selection of data records based at least in part on date values from said particular database column, said query module determines a result set satisfying said date criteria by performing set operations on said bitmaps.

27. The system of claim 26, wherein said plurality of year bitmaps comprises no more than N number of bitmaps, for representing a range of N number of years present in said particular database column.

28. The system of claim 26, wherein said plurality of month bitmaps comprise no more than twelve bitmaps, for representing a range of twelve months maximum.

29. The system of claim 26, wherein said plurality of day bitmaps comprises no more than thirty-one bitmaps, for representing a range of thirty-one days maximum.

30. The system of claim 26, wherein said particular column stores information having an SQL date data type.

31. The system of claim 26, further comprising:
prior to construction of said specialized date index, said indexing module decomposes each date value stored in said particular column into corresponding year, month, and day components.

32. The system of claim 26, wherein said bitmaps are grouped as follows: an array of year bitmaps for representing year information, an array of month bitmaps for representing month information, and an array of day bitmaps for representing day information.

33. The system of claim 32, wherein said array of month bitmaps comprises:
M[1] tracks rows of said database that have dates containing months 1 through 12, inclusive,
M[2] tracks rows of said database that have dates containing months 2 through 12, inclusive,
through
M[3] tracks rows of said database that have dates containing months 3 through 12, inclusive,
M[12] tracks rows of said database that have dates containing months 12 through 12, inclusive,
such that each successive bitmap stores a successively smaller subrange of possible month values.

34. The system of claim 33, wherein bitmaps are eliminated for any month whose corresponding month value does not exist in the particular column.

35. The system of claim 32, wherein said array of day bitmaps comprises:
D[1] tracks rows of said database that have dates containing days 1 through 31, inclusive,
D[2] tracks rows of said database that have dates containing days 2 through 31, inclusive, D[3] tracks rows of said database that have dates containing days 3 through 31, inclusive, . . .

D[31] tracks rows of said database that have dates containing days 31 through 31, inclusive, such that each successive bitmap stores a successively smaller subrange of possible day values.

36. The system of claim 35, wherein bitmaps are eliminated for any day whose corresponding day value does not exist in the particular column.

37. The system of claim 26, further comprising:

applying compression to at least some of said bitmaps.

38. The system of claim 26, wherein the database system may determine a result set satisfying a "equal to" condition (EQ), as follows:

$$EQ=(Y[y]-Y[y+1])\cap(M[m]-M[m+1])\cap(D[d]-D[d+1])$$

where Y[y] specifies a particular year bitmap for year y, M[m] specifies a particular month bitmap for month m, D[d] specifies a particular day bitmap for day d, and where ∩ indicates set intersection.

39. The system of claim 38, wherein the database system may determine a result set satisfying a "not equal to" condition (NE), as follows:

$$NE=EBM-EQ$$

where EBM specifies said existence bitmap.

40. The system of claim 26, wherein the database system may determine a result set satisfying a "greater than" condition (GT), as follows:

$$GT=Y[y+1]\cup((Y[y]-Y[y+1])\cap M[m+1])\cup((Y[y]-Y[y+1])\cap(M[m]-M[m+1])\cap D[d+1])$$

where Y[y] specifies a particular year bitmap for year y, M[m] specifies a particular month bitmap for month m, D[d] specifies a particular day bitmap for day d, and where ∩ indicates set intersection and ∪ indicates set union.

41. The system of claim 26, wherein the database system may determine a result set satisfying a "greater than or equal to" condition (GE), as follows:

$$GE\ Y[y+1]\cup((Y[y]-Y[y+1])\cap M[m+1])\cup((Y[y]-Y[y+1])\cap(M[m]-M[m+1])\cap D[d])$$

where Y[y] specifies a particular year bitmap for year y, M[m] specifies a particular month bitmap for month m, D[d] specifies a particular day bitmap for day d, and where ∩ indicates set intersection and ∪ indicates set union.

42. The system of claim 41, wherein the database system may determine a result set satisfying a "less than" (LT) operation, as follows:

$$LT=EBM-GE$$

where EBM specifies said existence bitmap.

43. The system of claim 41, wherein the database system may alternatively determine a result set satisfying a "greater than or equal to" condition (GE), as follows:

$$GE=Y[y+1]\cup((Y[y]-Y[y+1])\cap(M[m+1]\cup((M[m]-M[m+1])\cap D[d])))$$

where Y[y] specifies a particular year bitmap for year y, M[m] specifies a particular month bitmap for month m, D[d] specifies a particular day bitmap for day d, and where ∩ indicates set intersection and ∪ indicates set union.

44. The system of claim 40, wherein the database system may determine a result set satisfying a "less than or equal to" (LE) operation, as follows:

$$LE=EBM-GT$$

where EBM specifies said existence bitmap.

45. The system of claim 26, wherein the database system may determine a result set satisfying a date range criterion of Date1>=X and Date2<=Y, as follows:

$$GE\cap LE$$

where GE specifies an intermediate result set having date values greater than or equal to X, where LE specifies an intermediate result set having date values less than or equal to Y, and where ∩ indicates set intersection.

46. The system of claim 26, wherein the database system may determine a result set satisfying a date range criterion of Date1>=X and Date2<Y, as follows:

$$GE\cap LT$$

where GE specifies an intermediate result set having date values greater than or equal to X where LT specifies an intermediate result set having date values less than Y, and where ∩ indicates set intersection.

47. The system of claim 26, wherein the database system may determine a result set satisfying a date range criterion of Date1>X and Date2<Y, as follows:

$$GT\cap LT$$

where GT specifies an intermediate result set having date values greater than X, where LT specifies an intermediate result set having date values less than Y, and where ∩ indicates set intersection.

48. The system of claim 26, wherein the database system may determine a result set satisfying a date range criterion of Date1>X and Date2<=Y, as follows:

$$GT\cap LE$$

where GT specifies an intermediate result set having date values greater than X, where LE specifies an intermediate result set having date values less than or equal to Y, and where ∩ indicates set intersection.

49. The system of claim 26, wherein each date value in the database system is stored as an integer value, which may be decomposed into year, month, and day components.

50. The system of claim 49, wherein each date value comprises a 32-bit integer value.

51. The system of claim 26, wherein bitmaps are eliminated for any year whose corresponding year value does not exist in the particular column.

* * * * *